D. A. Cameron,
Band Saw Mill.
N° 10,678.    Patented Mar. 21, 1854.
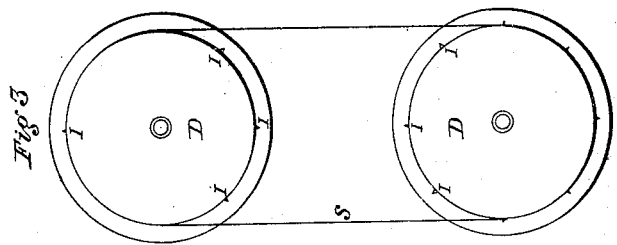
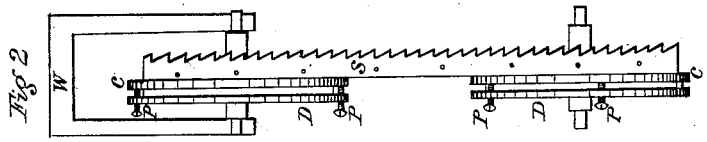
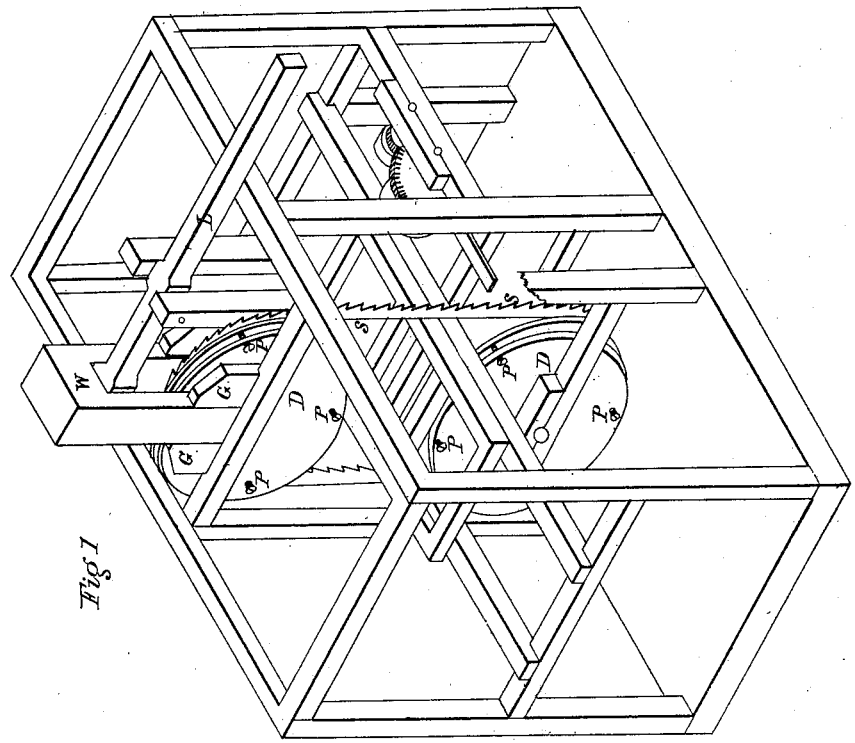

UNITED STATES PATENT OFFICE.

DAVID A. CAMERON, OF BUTLER, PENNSYLVANIA.

BELT-SAW.

Specification of Letters Patent No. 10,678, dated March 21, 1854.

*To all whom it may concern:*

Be it known that I, DAVID A. CAMERON, of Butler, in the county of Butler and State of Pennsylvania, have invented a new and useful Improvement in Belt-Sawmills; and I hereby declare the following to be a full and clear description thereof, reference being had to the accompanying drawings herewith presented, which drawings constitute a part of said description.

The nature of my invention consists in applying certain devices to obviate the difficulties that have heretofore attended the use of the belt saw. First the expansion and contraction of the saw has rendered it impracticable in the common mode of tightening the saw to keep it at any regular tension, by screwing up the drum or cylinder over which the saw runs; for immediately on commencing operation the saw would become heated and expanded so as to require tightening up, and one being again stopped it would cool and contract so as to break. Now to obviate this I have suspended the cylinder in a movable frame (W), which slides up and down between the cheeks or guides (G, G,). See the drawing.

Figure 1 is an isometrical view of the mill having a portion of the post removed to show the saw (S) in its place on the drums (D, D,) and it may be observed that this frame (W,) is forced upward by the lever (L,) which may be actuated by any desired weight so as to accommodate itself to the length of the saw and give it a constant and uniform tension. The drums are made with flanches (F F,) projecting out around one end and they are also furnished with movable collars (C, C,) made of metal and accurately fitted on the cylinder so as to be adjusted by the screw pins (P, P,) these are tapped through the flanches and press with their ends on the collar in order to adjust the saw. Fig. 2 shows a side view of the saw (S,) with the drums (D,) their collars (C,) the screwpins (P,) and the frame (W,). There is another improvement shown at Fig. 3, the small conical studs or pins (I, I,) are fixed at proper distances in the cylinder which enter into corresponding holes through the saw and insure its motion so there is no danger of its slipping on the drum.

The various other parts of the mill which need not differ from the common kind are so well known as to need no minute description of their forms or appendages.

What I claim as my invention, and desire to secure by Letters Patent, is—

1. The lever (L,) with the movable frame (W,) to tighten the saw and to keep it uniformly tight in the manner set forth.

2. I claim the sliding collar (C,) on the cylinder (or drum D) with adjusting screws, by which the saw is brought to project beyond the edge of the drum.

DAVID A. CAMERON.

Witnesses:
WM. F. WHITBECK,
AZA ARNOLD.